L. SCOFIELD.
PLANTER.

No. 188,547. Patented March 20, 1877.

Witnesses.
Grenville Lewis.

Inventor
Levi Scofield.
By Hill, Ellsworth & Spear
his attys.

UNITED STATES PATENT OFFICE.

LEVI SCOFIELD, OF GRAND HAVEN, MICHIGAN, ASSIGNOR OF ONE-HALF HIS RIGHT TO JUSTIN B. WAIT, OF SAME PLACE.

IMPROVEMENT IN PLANTERS.

Specification forming part of Letters Patent No. 188,547, dated March 20, 1877; application filed January 12, 1877.

*To all whom it may concern:*

Be it known that I, LEVI SCOFIELD, of Grand Haven, in the county of Ottawa and State of Michigan, have invented a new and useful Improvement in Planters; and I do hereby declare the following to be a full, clear, and exact description of the same, reference being had to the accompanying drawings, forming part of this specification.

My invention relates to planters adapted to be drawn by one horse, and used for planting corn, beans, sugar-cane, broom-corn, or any similar seed, and consists in certain improvements in details, and in adaptations of inventions described in patents heretofore granted me, as will be hereinafter fully set forth.

That part of the invention which I will first describe consists in the adaptation of the chain movement described in the patent granted me on the 18th day of January, 1876, and numbered 172,280, to a one-horse machine.

Figure 1:
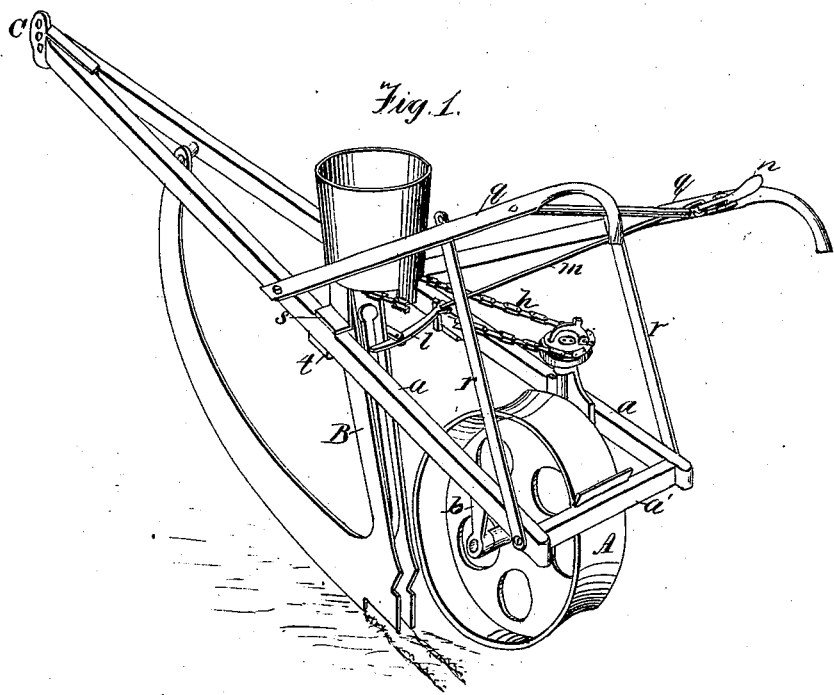
Figure 4:
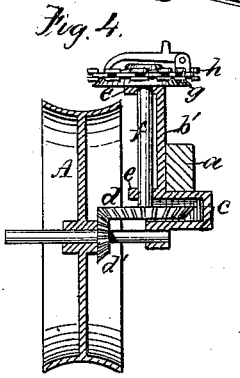

The machine is substantially such as that represented in Figure 1 of the drawings. The side beams $a\ a$ of the frame rest on brackets $b\ b'$, the latter shown in Fig. 4, and in the lower ends of these brackets are the bearings for the axle of the wheel A. The bracket $b$ is of ordinary form, and serves simply the purpose of giving the side beam support upon the ends of the axle. The other, marked $b'$, serves as a support for the vertical shaft, which, with its sprocket-wheel above and bevel-gear below, serves to communicate motion to the chain, which operates the seed-plate. It is formed with a shell, $c$, on which the side beam rests, and which serves to partially cover the bevel-gear $d$. Two studs, $e\ e$, one on the upper end and one below, serve as bearings for the upright shaft $f$. The bevel-gear $d$, fixed on the lower end of the shaft, meshes into a corresponding gear, $d'$, which is fast on the axle. The sprocket-wheel on the upper end is not fast on the shaft, but may revolve freely thereon, or be connected so as to revolve with the shaft at pleasure, by means of a dog and perforation in the sprocket-wheel, which perforation, as the sprocket revolves, registers with like perforations in a wheel $g$, fixed on the vertical shaft $f$. The dog is pivoted on the sprocket-wheel, which itself rests on the wheel $g$. This method of connection is the same as that described in the patent referred to above, and in the same manner as set forth in that patent, allows the seed-plate to be thrown into and out of gear with the drive-wheel. A chain, $h$, connects the sprocket-wheel to the seed-plate, and carries the said plate in the same manner as that shown in the patent named. For this machine I prefer to regulate the seed-plates for different kinds of seed in the same manner as that described in my patent No. 121,204, granted November 21, 1871.

I prefer also to use the cut-off described and claimed in my patent of April 13, 1875, No. 162,106, and deem it unnecessary to show these parts, as they have been already fully set forth.

The second part of my invention relates to the construction and manner of attaching and operating the check-valve, by which the seed is held in the conductor-tube until the proper time for dropping it in the mark. The construction and arrangement of the parts are shown in Figs. 1, 3, and 5.

Figure 5:
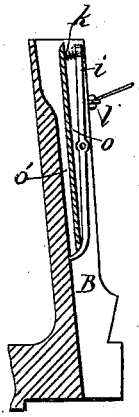

Within the rear and open part of the standard B, in which is the seed or conductor-tube, is pivoted the check-valve, marked $i$, and shown more clearly in Fig. 5. The lower end thereof is bent, and covers and closes, when pressed forward, the lower end of said seed-tube. It is held normally closed by means of a spring, $k$. Pivoted to the side of the standard B is a short lever, $l$, one end of which bears against the upper end of the check-valve $i$, and serves to press the said upper end in against the spring and open the seed-tube below. This short lever is operated at the will of the driver by means of rod $m$ carried back to a bell-crank lever, $n$, pivoted on the handle convenient to his hand, and adapted to be moved by his thumb. By pressing in the free end of the said lever, the rod $m$ connected to the other end is drawn back, the free end of the short lever pressed in, upon the upper end of the check-valve, and the seed-tube thereby opened to drop the seed into the ground.

The construction of this seed or conductor-tube, which forms the third part of my invention, is represented more clearly in the section shown in Fig. 5. It is formed of a wooden back or partition, marked o. This leaves in the forward part of the hollow standard a passage, o', for the seed wholly independent of the check-valve, which is pivoted outside thereof, as has been described. The position of the partition permits the rear extension of the standard to inclose the sides of the valve, and thereby form shields or guards for the latter, by which dirt, &c., is excluded and prevented from interfering with its movements. When the planter is used for drilling seed, the check-valve may be removed, and in machines intended only for the purpose of drilling this valve is omitted altogether.

Figure 3:
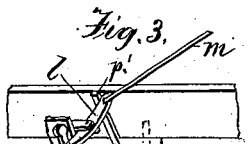

Represented in the detached view, Fig. 3, is a stop, by which, when the check-valve is made a part of the machine, it may be held permanently out of contact with the lower opening of the seed-tube. This stop, marked p, consists of a small slotted bar, held to the under side of the frame by a screw passing through the slot into the side piece. An arm, p', from this bar extends up behind the lever l. In order to hold the lever in such position as shall keep the check-valve open, the stop is drawn back with the lever and held in position by the set-screw. This stop may be placed on the top side of the frame, if preferred.

By the construction which I have described, the same machine may be used either for check-row planting, or for drilling. The seed-plates operate uniformly, and, whether the valve is in operation or not pass the seed into the conductor. When the check-valve is in operation a given amount of seed, dropped from the automatic mechanism above, is held by the valve until the seed-tube is over the proper point, when the driver, by pressure upon the bell-crank lever or the handle, withdraws the valve and release the seed. For this purpose the ground should be previously marked, and the planter driven across the marks. The number of grains dropped in each hill is, of course, regulated by the seed-plates, the office of the check-valve being simply to hold this given quantity till the arrival of the tube to the mark, as before described. In drilling, the stop p is set back, and the seed is dropped at regular intervals and without obstruction by the automatic mechanism.

A fourth point in my improvement relates to the frame, which, by a very simple arrangement of the parts, I have made cheap and strong. The side pieces a a are brought together at the forward end, and bolted to the clevis. At the rear they diverge sufficiently to give space within the frame for the wheel and working parts. The side pieces are connected at the rear by a cross-bar, a', which completes the frame. To this rear piece I attach a scraper, y, to clear the wheel.

Other planter-frames are made part wood and part iron, while some have a bent side piece. The form shown by me, being short and in one piece, is much cheaper and stronger.

The handles q q are attached to the side pieces a a, as shown in Fig. 1, and are braced from the rear by rods or bars r r, the upper end of which may be provided with small holes, for the purpose of connecting the handles to the bars at different heights.

The hopper and seeding mechanism are supported on the side beams a a by the flanges s, and, like flanges t on the standard, form like connections for that.

Figure 2:
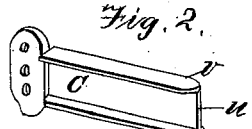

The clevis which constitutes the fifth part of the invention is represented in place in Fig. 1, and detached in Fig. 2, and is marked C. It is formed with the usual vertical flange for the connection with the draft. The body of it is formed with a web, u, and flanges v v, on the top and bottom, which make it, in section, like the double T beam. The ends of the beams a a, properly chamfered, fit between these flanges, and may be firmly connected to the clevis by a single bolt, the flanges alone preventing any turning movement of the clevis on the beams.

I claim as my invention—

1. In a seed-planter, adapted to be drawn by one horse, the combination of the single drive-wheel, a vertical shaft driven by said wheel, and a sprocket and chain, or equivalent, connection for the seed-plate, as set forth.

2. The combination of the driving-wheel A, vertical shaft f, and connecting bevel-gears d d', with the wheel g, and the adjustable sprocket-wheel, as set forth.

3. The bracket b', formed with the shell c and studs e e, in combination with the shaft f and bevel-gear d, as set forth.

4. The check-valve i, pivoted within the seed-tube, and the spring k, arranged between the partition or back o, and the upper end of the valve, substantially as described, for the purpose specified.

5. The combination of the check-valve i and its spring k, with the lever l, operated by means of connections within reach of the driver, as set forth.

6. The combination of the lever l and adjustable stop p, as set forth.

7. In a seed-planter, the combination of an automatic mechanism for dropping the seed in regulated quantities, a check-valve for detaining such seed in the tube, and a stop by which the check-valve may be held out of operation, as set forth.

8. The partition or back o, let or fitted into the standard B, to form the seed-tube, and at the same time permit the rear edges of the standard to form protecting side walls for the check-valve and its spring, substantially as described.

9. The combination of the beams a a, colter pivoted between said beams, standard B, and flanges t, as set forth.

10. The frame of the seed-planter, consisting of the straight side beams $a\ a$, the flanged clevis, the rear end piece $a'$, and suitable handles, having combined with it the raised hopper, the colter and seed-standard B, and the brackets $b\ b'$, for the support of the driving-wheel, and the mechanism for communicating motion from the driving-wheel to the seed-plate, substantially as and for the purpose specified.

LEVI SCOFIELD.

Witnesses:
GEO. STICKNEY,
W. J. H. SAUNDERS.